March 17, 1959 J. R. WALD, JR., ET AL 2,878,034
STEERING DEVICE FOR SURFACE MAKING APPARATUS
Filed June 14, 1955 4 Sheets-Sheet 1

INVENTORS
Rufus W. Wilson
John R. Wald, Jr.
BY Karl W. Flocks
ATTORNEY

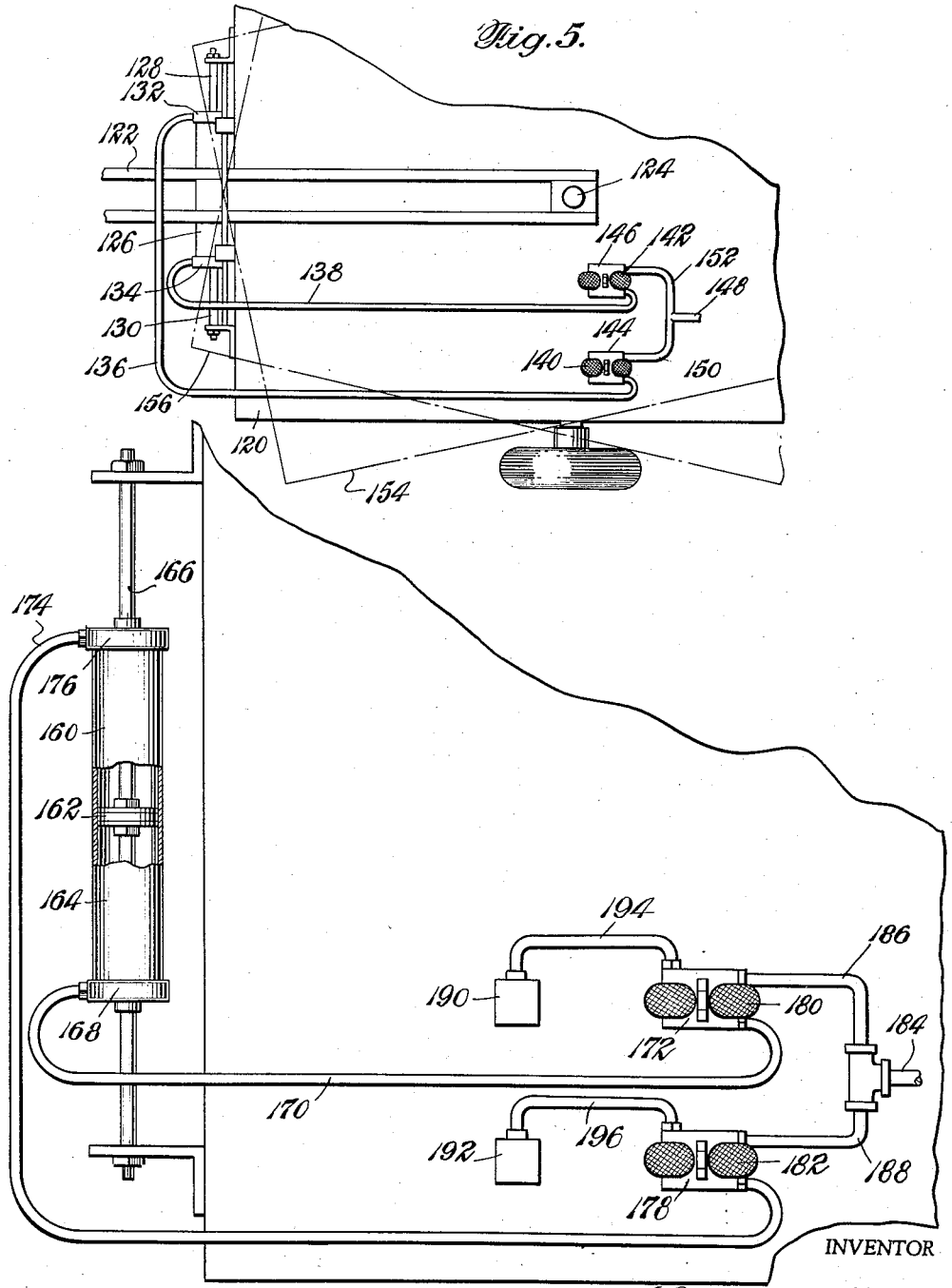

United States Patent Office 2,878,034
Patented Mar. 17, 1959

2,878,034

STEERING DEVICE FOR SURFACE MARKING APPARATUS

John R. Wald, Jr., Montoursville, and Rufus W. Wilson, Huntingdon, Pa., assignors to Wald Industries, Inc., Huntingdon, Pa., a corporation of Pennsylvania Application June 14, 1955, Serial No. 515,462

4 Claims. (Cl. 280—463)

The present invention relates to apparatus for marking a surface. More particularly, the present invention relates to steering apparatus for use with a traffic line marking machine.

In the art of applying traffic lines on highways, roads and the like, various types of devices have been employed heretofore ranging from the manually operated striper to the self-propelled and vehicle towed striper. All of these heretofore known stripers were adapted to carry equipment that included means for generating a spray of paint binder and nozzle means for discharging the paint onto the surface to be marked. Prior to the instant invention, other apparatus in the form of a trailer towed by a vehilcle was developed, the trailer being utilized in a two-fold manner, that is, for applying traffic lines on a highway by carrying the conventional striping equipment, and for storing traffic line guards that were adapted to be placed on and removed from the highway after the traffic line was applied thereto.

The present invention is designed to be utilized with the trailer-type striper and has application specifically in the steering of the trailer to correctly apply the traffic line or to accurately retrace a previously applied line. Heretofore the trailer-type stripers were not provided with steering apparatus that enabled the operator to accurately follow a prescribed marking and thus considerable skill and cooperation between the driver of the vehicle towing the trailer and the trailer operator was necessary in order to successfully apply the traffic line in the correct manner.

It is therefore an object of the present invention to provide apparatus for marking a surface, wherein a trailer adapted to be towed by a vehicle along the surface of a road is provided with steering means for accurately following a prescribed line on the surface to be marked.

Another object of the present invention is to provide apparatus for marking a surface wherein pneumatically operated steering means is employed for controlling the movement of a striping machine whereby the striping machine is caused to accurately follow a prescribed line on the surface.

Still another object of the present invention is to provide a pneumatic steering means for surface marking apparatus which includes an air cylinder having a double acting piston positioned therein, the movement of the double acting piston being adapted to control the direction of travel of the surface marking apparatus.

Other objects and the nature and advantages of the instant invention will be apparent from the following description taken in conjunction with the accompanying drawings, wherein:

Fig. 5 is a modified form of the pneumatic steering means embodied herein; and

Fig. 6 is a further modified form of the pneumatic steering means embodied herein.

Figure 1:
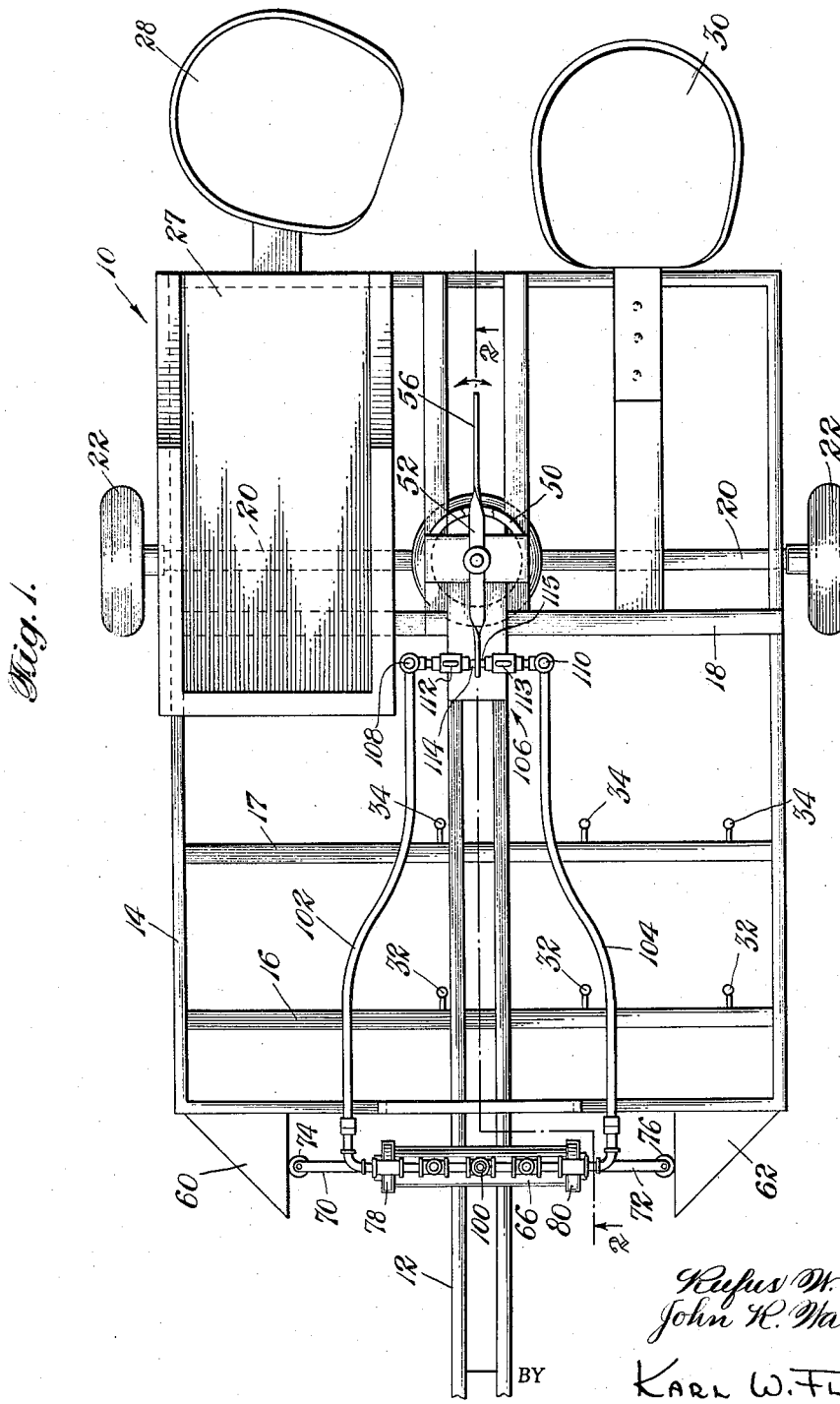
Fig. 1 is a plan view of a trailer that is adapted to be secured to a towing vehicle, one form of the steering apparatus embodied in the present invention being mounted on the trailer.
Figure 2:
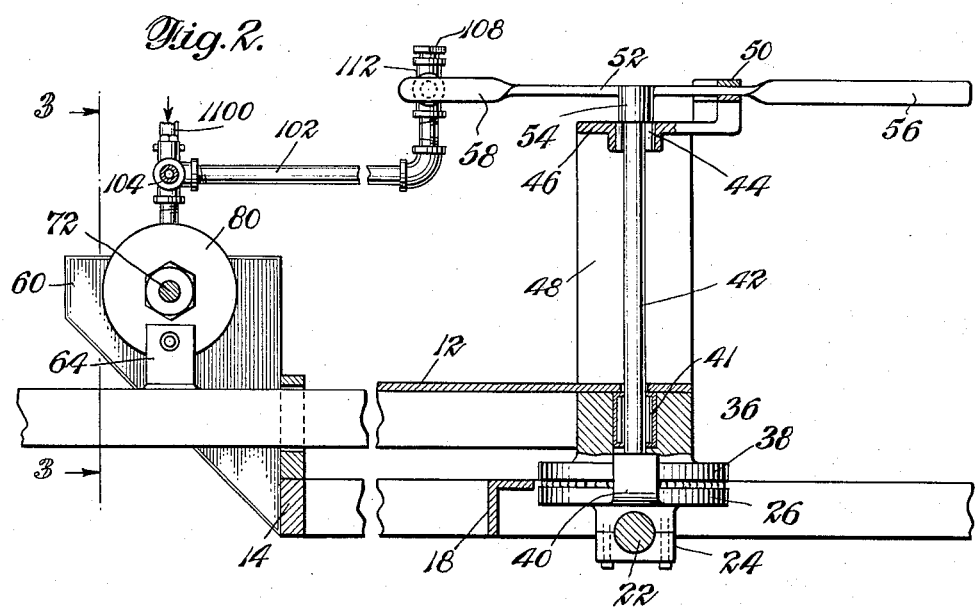
Fig. 2 is a sectional view taken along the lines 2—2 of Fig. 1.
Figure 3:
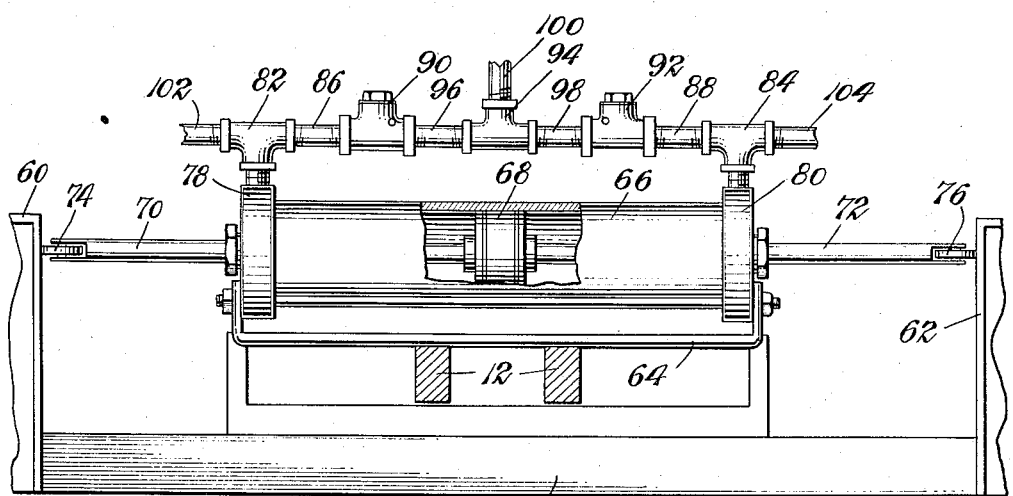
Fig. 3 is a sectional view taken along the lines 3—3 of Fig. 2.
Figure 4:
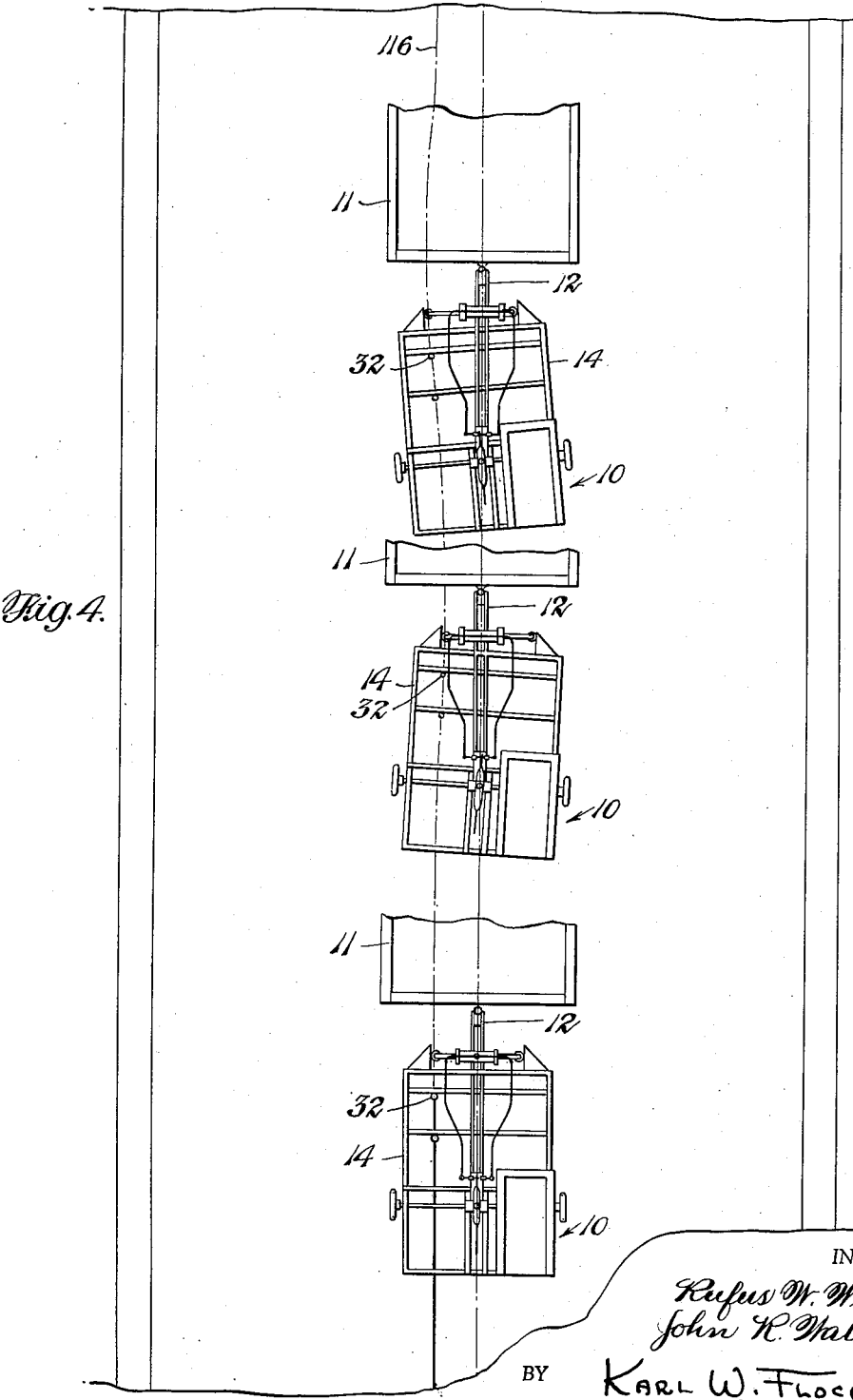
Fig. 4 is a diagrammatic illustration showing the manner in which the steering apparatus embodied herein controls the movement of the trailer on which it is mounted to enable a traffic line to be correctly applied or accurately retraced.

Referring now to the drawings, and particularly Figs. 1–4, one form of the present invention is illustrated and comprises a trailer generally indicated at 10, the trailer 10 being adapted to be secured to the rear end of a towing vehicle illustrated in Fig. 4 at 11. The trailer 10, which is adapted to carry traffic line striping apparatus, is mounted for pivotal movement on a longitudinally extending tongue 12, the tongue 12 being suitably connected to the rear end of the towing vehicle 11. As shown in Fig. 1, the trailer 10 includes a generally rectangularly shaped frame 14 that is provided with cross members 16, 17 and 18. Secured to the frame in the sides thereof is an axle 20 that has ground wheels 22 rotatably mounted on the outermost ends thereof. Referring to Fig. 2, the axle 20 is shown receiving a block 24 intermediate the ends thereof, the block 24 having a bearing disc 27 formed integral therewith.

Mounted on the rear of the frame 14 and engaging the cross member 18 is a hopper 26 that is adapted to receive traffic line guards used for protecting a freshly applied line. A seat 28 is secured to the rear of the frame 14 and extends outwardly therefrom, and is utilized in the line guard placing or recovering operation. It is seen that after a traffic stripe has been applied to a road, an operator occupying the seat 28 may either place line guards on the stripe for protection thereof, removing the guards from the hopper 26, or recover the guards from the road, placing them in the hopper 26. Also secured to the rear of the frame 14 and extending outwardly therefrom is a seat 30 that is adapted to be occupied by the operator of the steering apparatus to be described hereinbelow.

In order to apply the traffic line stripe to the surface to be marked, the cross members 16 and 17 are provided with brackets (not shown) that are adapted to have secured thereto paint guns diagrammatically indicated at 32 and glass sphere dispensers diagrammatically indicated at 34. As shown in Fig. 1, the trailer 10 is equipped with three paint guns 32 and three sphere dispensers 34, but it is understood that as many of these units as desired may be mounted on the frame 14 of the trailer. In operation of the device, the paint guns 32 are supplied with paint binder under pressure from apparatus that is mounted on the towing vehicle 11. It is seen that the paint guns 32 and sphere dispensers cooperate to spray a marking in the form of a stripe onto a highway or road, the stripe having autocollimating characteristics and defining traffic lanes.

In order to pivotally mount the frame 14 with respect to the tongue 12, a boss 36 is secured adjacent the rear end thereof and extends downwardly, terminating in a bearing disc 38 similar to the disc 26. Suitable bearings are provided between the discs 26 and 28, thereby providing for relative rotation therebetween. As shown in Fig. 2, a clamping member 40 is secured to the disc 26 and slidably engages the upper surface of the disc 38 and not only enables the disc 38 to rotate relative to the stationary disc 26, but also prevents endwise movement thereof. Formed in the boss 36 is an opening 41 which extends into the disc 38 and receives a control shaft 42 therein. The control shaft 42 extends upwardly through a bearing 44 mounted in a plate 46, the plate 46 being secured to a standard 48 that is mounted on the frame 14. Formed integral with the plate 46 is a friction strap 50 that is adapted to frictionally engage a control lever 52, the control lever 52 being secured to a collar 54. The collar 54 is secured to the shaft 42 and is adapted to rotate the shaft 42 upon rotation of the control lever 52. The control lever 52 terminates in a handle 56 on one end thereof, the handle 56 being adapted to be actuated by the operator of the machine. An operating end portion 58 is formed on the other end of the control lever 52 and is adapted to alternately actuate a pair of poppet valves to be described in more detail hereinafter.

Mounted on the front end of the frame 14 in spaced relation are brackets 60 and 62 which are shown being formed in a triangular configuration, as seen in the plan view, although it is understood that these brackets may be formed in any desired configuration provided that a flat face is formed on the inner side thereof. Positioned between the brackets 60 and 62 and secured to the tongue 12 as shown in Fig. 3 is a bracket 64. Bolted to the bracket 64 is an air cylinder 66 which has a double acting piston 68 positioned therein. Secured to the double acting piston 68 are piston rods 70 and 72 which extend through opposite ends of the cylinder 66 and have secured to the outer end thereof cams 74 and 76, respectively. As shown in Fig. 3, the cams 74 and 76 are adapted to engage the brackets 60 and 62, respectively, in response to movement of the piston 68 and will therefore cause pivotal movement of the frame 14, as will hereinafter be described. The cylinder 66 is formed with end portions 78 and 80, respectively, which alternately define air admission and exhaust means for the cylinder 66. Connected to the end portions 78 and 80, respectively, are T connectors 82 and 84 which have connected thereto pipes 86 and 88, respectively. Check valves 90 and 92 are connected to the pipes 86 and 88, respectively, and are adapted to communicate with an air inlet T connector 94 through pipes 96 and 98, respectively. The air inlet T connector 94 is connected to an inlet 100 that communicates with a convenient supply of compressor air, such as an air compressor mounted on the vehicle 11. Connected to the T connectors 82 and 84, respectively, are air pipes 102 and 104, which extend rearwardly of the trailer 10 as shown in Fig. 1 to an air control header generally indicated at 106. The air control header 106 includes speed control valves 108 and 110 which are connected to air pipes 102 and 104, respectively, the speed control valves 108 and 110 communicating with poppet valves 112 and 113, respectively, which are adapted to bleed air from the air pipes 102 and 104. The poppet valves 112, 113 include spring loaded plungers 114, 115, respectively, which engage the operating end 58 of the control lever 52 and are adapted to be depressed thereby, to bleed air from either side of the piston 68 positioned in the cylinder 66.

The operation of the steering device illustrated in Figs. 1–4 is as follows: With reference being made particularly to Fig. 4, the trailer 10 is shown operatively connected to the rear of the towing vehicle 11 through the tongue 12, the trailer 10 being pivotally movable with respect to the tongue 12. The operator of the vehicle 11 drives the vehicle 11 along the road to be marked, attempting to follow as best as possible a route that will enable the paint guns 32 and sphere dispensers 34 to follow a prescribed line 116. However, since it is not possible for the trailer 10 to duplicate the exact route of the vehicle, the operator of the trailer positioned in the seat 30 must vary the position of the frame 14 with respect to the tongue 12 to cause the paint guns 32 to follow the prescribed line 116. In order to vary the position of the frame 14 with respect to the tongue 12, the operator of the trailer actuates or pivotally moves the handle 56 in the desired direction. Assuming that the trailer 10 is to follow the direction of the line 116 as shown in Fig. 4, the front of the frame 14 must be pivoted to the right and then to the left to cause the paint gun 32 to retrace the line. In carrying out this steering operation, the operator moves the operating end portion 58 of the control lever 52 in a counterclockwise direction as seen in Fig. 1 to compress plunger 115 and open the poppet valve 113. Compressed air from a suitable source which has entered the air cylinder 66 on both sides of the piston 68 through the end portions 78 and 80 then escapes through the air pipe 104 and the actuated poppet valve 113. Since the pressure in the cylinder 66 is decreased on the right side of the piston 68, as seen in Fig. 3, the increased pressure on the left side of the piston 68 forces the piston 68 to the right, thereby moving the cam 76 into engagement with the bracket 62. Since the air cylinder 66 is secured to the tongue 12 through the bracket 64, the frame 14 of the trailer on which the bracket 60 is mounted will be caused to rotate on the bearing disc 26 and the frame 14 will be pivotally moved to the right, as seen in Fig. 4. The frame 14 may accordingly be pivotally moved in the direction opposite to that just described by rotating the lever 52 until the operating end portion 58 depresses the plunger 114 of the poppet valve 112. The plunger 115 of the poppet valve 113 is released from the depressed portion thereof, thereby sealing the air pipe 104 and compressed air again enters the cylinder 66 through end portion 78. With the plunger 114 of the poppet valve 112 depressed, air is exhausted from the poppet valve 112 from the left-hand end of the cylinder 66 and escapes through air pipe 102 and poppet valve 112. The increased pressure on the piston 68 from the right, as seen in Fig. 3, moves the cam 74 into engagement with the bracket 60 and the frame 14 is thereby caused to pivot in a clockwise direction as seen in Figs. 1 and 4. It is seen that the operator may vary the movement of the frame 14 with respect to the tongue 12 by simply moving the control lever 52 to depress either of the plungers 114, 115 of the poppet valves 113 or 112. Thus, as the trailer 10 is towed along the road to be marked, the operator, by lining up the paint guns 32 with the prescribed line 116, controls the movement of the frame 14 of the trailer to duplicate the prescribed line on the surface. As shown in Fig. 4, the frame 14 has been moved from right to left as it is advanced along the road, although the tongue 12 has remained substantially in a fixed position following the towing vehicle 11.

Referring now to Fig. 5, a modified form of the present invention is illustrated. In the modification shown in Fig. 5, a frame 120 of a trailer is pivotally mounted on a tongue 122 at 124 in the manner described above. An air cylinder 126 is secured to the tongue 122 and is provided with a double acting piston therein having piston rods 128 and 130 secured thereto. End portions 132 and 134 for admitting air under pressure to the air cylinder 126 are provided and communicate with air lines or pipes 136 and 138, respectively. The modified form of the invention shown in Fig. 5 eliminates the air control header and utilizes foot control pedals for supplying air to and bleeding air from the air cylinder 126, the foot control pedals being illustrated at 140 and 142. By utilizing the foot pedals, the hands of the operator of the device are free to perform other operations, as desired. The foot control pedals 140 and 142 control three-way valves 144, 146, respectively, associated therewith, the valves 144, 146 in turn communicating with an air supply header 148 through air lines 150 and 152, respectively. In the operation of the device shown in Fig. 5, if it is desired to move the frame 120 to the position shown in dotted lines at 154 to allow the paint gun associated therewith to follow a prescribed line, the foot control pedal 140 is depressed to allow air from the header 148 to enter the line 136. The foot control pedal 142 is depressed to a position such that air in the line 138 is exhausted to atmosphere. It is seen then that the piston within the cylinder 126 will be moved in a direction to cause the air in the cylinder to exhaust through the end portion 134 and line 138 and then to atmosphere through the valve 146 controlled by the foot control pedal 142. If it is desired to move the frame 120 to the position shown in dotted lines at 156, the foot control pedals are depressed in the opposite direction from that described above, air under pressure entering the cylinder 126 through the air line 138 and exhausted from the cylinder 126 through the air line 136 and valve 144. The piston within the cylinder 126 is moved in a direction to cause the piston rod 128 and associated cam to abut against a cam stop bracket, thereby pivoting the frame 120 to the position indicated in dotted lines at 156.

Referring now to Fig. 6, a further modified form of the present invention is illustrated and includes structure substantially as that described above in connection with Fig. 5. An air cylinder 160 is secured to a tongue, not shown, that is, in turn, connected to a towing vehicle. The air cylinder 160 has positioned therein a piston 162 to which is secured piston rods 164 and 166. Communicating with an end portion 168 located at one end of the cylinder 160 is an air line 170 that is connected to a three-way valve 172. Similarly, an air line 174 communicates with the other end portion 176 of the air cylinder 160 and is connected to a three-way valve 178. The three-way valves 172 and 178 are controlled by foot pedals 180 and 182, respectively, and communicate with an air supply header 184 through air lines 186 and 188, respectively. In order to control the air exhausted from the cylinder 160, regulated exhaust valves 190 and 192 are provided and communicate with the valves 172 and 178 through air lines 194 and 196, respectively. It is seen that the operator of the device may control the movement of the frame and thus retrace a paint stripe by controlling the valves 172 and 178 by the foot pedals 180 and 182. By depressing the foot pedal 180, air may be exhausted through the valve 172 and then through the regulated exhaust valve 190. The foot pedal 178 is depressed oppositely to allow air to be admitted to the valve 178 from the header 184 and into the air line 174. The piston 162 is then moved downwardly as seen in Fig. 6 to thereby move the frame associated therewith accordingly.

It is seen that the present invention provides an effective but simple manner for controlling the movement of a towed trailer to cause a paint gun mounted on the trailer to duplicate or trace a prescribed line. The operator of the device may cause the trailer frame to pivot as required by simply rotating a lever or depressing conveniently located foot pedals.

It will be obvious to those skilled in the art that various changes may be made without departing from the spirit of the invention and therefore the invention is not limited to what is shown in the drawings and described in the specification but only as indicated in the appended claims.

What is claimed is:

1. In apparatus for marking a surface, a longitudinally extending tongue adapted to be connected to a towing vehicle, a frame mounted for pivotal movement on said tongue, an air cylinder secured to said tongue and having a piston positioned therein, brackets mounted on said frame adjacent the front end thereof and located in spaced apart relation, piston rods connected to said piston and extending outwardly beyond said cylinder, the outer end of each of said piston rods operatively engaging the adjacent bracket in sliding relation, control means mounted on said frame for controlling the movement of said cylinder with respect to said frame, said control means including an air inlet conduit communicating wtih said cylinder, a pair of exhaust conduits communicating with said cylinder and a control valve operatively associated with each of said exhaust conduits, said control valves controlling the exhaust of air from said cylinder, whereby said cylinder is movable in a direction that is opposite to the end from which the air is exhausted from said cylinder, said cylinder thereafter being pivotally movable to pivotally move said frame with respect to said tongue.

2. In apparatus for marking a surface, a longitudinally extending tongue adapted to be connected to a towing vehicle, a frame mounted for pivotal movement on said tongue, brackets mounted on said frame adjacent the front end thereof and located in spaced apart relation, an air cylinder secured to said tongue and having a piston positioned therein, piston rods connected to said piston and extending outwardly beyond said cylinder, a cam connected to the outer end of each of said piston rods and engaging the adjacent bracket in sliding relation therewith, said brackets thereby defining stops, and means operatively associated with said cylinder for controlling movement thereof to thereby control movement of said frame, said control means including inlet conduit means communicating with said cylinder for admitting an operating medium into said cylinder on both sides of said piston, exhaust conduit means communicating with said cylinder for directing said operating medium from said cylinder, and control valve means communicating with said exhaust conduit means for controlling the exhaust of said operating medium from said cylinder, said cylinder being movable in response to the exhaust of operating medium therefrom to cause said frame to pivotally move with respect to said tongue.

3. In apparatus for marking a surface, a longitudinally extending tongue operatively connected to a towing vehicle, a frame mounted for pivotal movement on said tongue, means for pivoting said frame with respect to said tongue, said pivoting means including spaced stop members mounted on said frame, a cylinder secured to said tongue and positioned between said stop members, a piston located in said cylinder and having piston rods joined thereto, said piston rods extending outwardly from said cylinder and operatively engaging said stop members, means operatively associated with said cylinder for admitting air thereto and means operatively associated with said cylinder for controlling the exhaust of air therefrom, said cylinder being movable in response to the exhaust of air therefrom in a direction that is opposite to that from which the air is exhausted therefrom, said frame being movable with said cylinder with respect to said tongue.

4. In apparatus for marking a surface as set forth in claim 3 wherein said control means includes exhaust conduits communicating with both ends of said cylinder, a control valve associated with each of said exhaust conduits and a pivotally mounted control handle that operatively and alternately engages said valves to regulate the exhaust of air from said cylinder.

References Cited in the file of this patent

UNITED STATES PATENTS

| | | |
|---|---|---|
| 692,879 | Lemp | Feb. 11, 1902 |
| 859,235 | McFarren | July 9, 1907 |
| 1,391,760 | Collier | Sept. 27, 1921 |
| 1,908,095 | York et al. | May 9, 1933 |
| 2,015,695 | Sapp | Oct. 1, 1935 |
| 2,152,021 | Baumer | Mar. 28, 1939 |
| 2,220,316 | Creswell et al. | Nov. 5, 1940 |
| 2,653,031 | Butler | Sept. 26, 1953 |